United States Patent
Kooi

(10) Patent No.: US 7,307,141 B2
(45) Date of Patent: Dec. 11, 2007

(54) THERMORESPONSIVE SENSOR COMPRISING A POLYMER SOLUTION

(75) Inventor: Chee Choong Kooi, Penang (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/399,890

(22) Filed: Apr. 7, 2006

(65) Prior Publication Data
US 2007/0029198 A1 Feb. 8, 2007

Related U.S. Application Data

(63) Continuation of application No. 10/918,045, filed on Aug. 12, 2004, now Pat. No. 7,026,441.

(51) Int. Cl.
*C08F 6/00* (2006.01)
(52) U.S. Cl. ............... 528/499; 204/450; 204/451; 204/452; 355/30; 355/53; 355/72; 522/153; 522/162
(58) Field of Classification Search ........ 204/450, 204/451, 452; 355/30, 53, 72; 522/153, 522/162; 524/211, 233; 528/499
See application file for complete search history.

(56) References Cited

U.S. PATENT DOCUMENTS 5,587,404 A * 12/1996 Kroner et al. ............ 522/85
6,165,389 A * 12/2000 Asher et al. ............. 252/582
2003/0105455 A1 6/2003 Santini et al.
2003/0204180 A1 10/2003 Huang et al.

FOREIGN PATENT DOCUMENTS

JP 07332219 * 12/1995

OTHER PUBLICATIONS

Agarwal et al, "Temperature sensor Strategies Keep System Thermal Problems in Check" by Microchip Technology Inc. ((2003) pp. 1-5.*

* cited by examiner

*Primary Examiner*—Terressa Boykin
(74) *Attorney, Agent, or Firm*—Darby & Darby P.C.

(57) ABSTRACT

Methods and apparatus for measuring and/or controlling the temperature on the surface or inside of micro chips are provided, including using thermally responsive polymers.

25 Claims, 4 Drawing Sheets

THERMORESPONSIVE SENSOR COMPRISING A POLYMER SOLUTION

CROSS REFERENCE TO RELATED APPLICATIONS

This is a continuation application of U.S. application Ser. No. 10/918,045 filed Aug. 12, 2004, now issued as U.S. Pat. No. 7,026,441. The disclosure of the prior application is considered part of and is incorporated by reference in the disclosure of this application.

BACKGROUND OF THE INVENTION

1. Field of the Invention

The present invention relates generally to the field of thermally responsive switches and/or sensors for micro chips or biological microelectromechanical systems (bio-MEMS), and more specifically, to the switches and/or sensors utilizing thermally responsive polymers.

2. Background Information

When micro chips and/or MEMS are used in many devices and applications, they are frequently subjected to temperature changes. To ensure optimal conditions for functioning the micro chips and/or MEMS, there exist a need to control and/or regulate the temperature of the microchip and/or MEMS. In many applications it is important to quickly and precisely measure the temperature on the external surface of the microchip and/or MEMS. It is also important to be able to maintain the temperature at a constant, predetermined level. Currently, thermocouples are used for these purposes.

While thermocouples can provide good temperature control, they have some drawbacks and disadvantages. One disadvantage is that the thermocouples allow to measure the temperature only at a very narrow spot of the surface of the microchip. In general, a thermocouple can show the temperature at a point where it is attached to the surface, but cannot provide the accurate information about the temperature at the area surrounding the point of attachment, much less at the areas more remote from the point of attachment of the thermocouple.

Unfortunately, better methods for measuring and/or controlling the temperature on the surface of the microchip, allowing to measure and/or control the temperature at wider areas of the surface, have not been described. Thus, need exists for methods and devices allowing to measure and/or control the temperature at wider areas of the surface of micro chips.

DETAILED DESCRIPTION OF THE INVENTION

Figure 1:
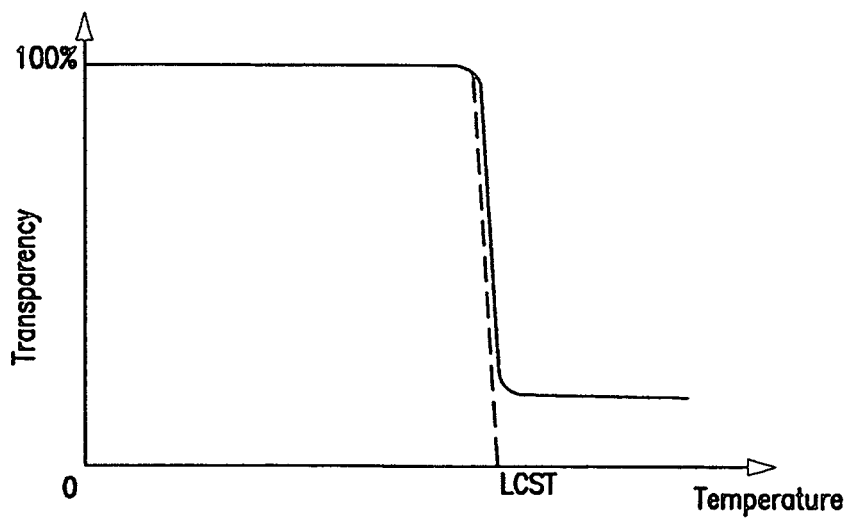
FIG. 1 shows a change of transparency of a polymer solution as a function of temperature.

One embodiment of the invention provides a polymer solution that includes at least one polymer dissolved in a solvent. The solution can be optically transparent at a temperature below the lower critical solution temperature of the polymer solution, and can be turbid at a temperature equal to the lower critical solution temperature of the polymer solution, or at a higher temperature.

Another embodiment of the invention provides an apparatus for detecting and/or controlling temperature on an external surface of a microchip or inside a microchip. The apparatus can include a tube placed in contact with the surface of the microchip, the tube containing a polymer solution. The polymer solution contained in the tube can include a polymer dissolved in a solvent, the polymer solution in the tube can be optically transparent at a temperature below the lower critical solution temperature, and can be turbid at a temperature equal to the lower critical solution temperature, or at a higher temperature.

Yet another embodiment of the invention provides a method for measuring the temperature on an external surface of a microchip or inside a microchip. The method includes placing a tube in contact with the surface of the microchip, the tube containing a polymer solution in an optically transparent state, followed by directing a light signal through the polymer solution and by detecting the transition of the polymer solution into a turbid state.

Another embodiment of the invention provides a method for maintaining an external temperature of a microchip at a predetermined level. The method includes placing a tube in contact with the surface of the microchip, the tube containing a polymer solution in an optically transparent state, wherein the temperature of the polymer solution is at the predetermined temperature level below the lower critical solution temperature, followed by directing a light signal through the polymer solution until the light signal is terminated as a result of the transition of the polymer solution into a turbid state indicating that the temperature of the polymer solution has risen to at least the lower critical solution temperature, and cooling the microchip to the predetermined temperature level to resume the directing of the light signal. The cycle of directing the light and cooling can be repeated to maintain the predetermined external temperature of the microchip.

The following terminology and definitions apply. The term "polymer" is defined as being inclusive of homopolymers, copolymers, oligomers, telomers, macromers, and prepolymers. The term "copolymer" is defined as a polymer derived from more than one species of monomer, including copolymers that are obtained by copolymerization of two monomer species, those obtained from three monomers species ("terpolymers"), those obtained from four monomers species ("quaterpolymers"), etc.

The term "copolymer" is further defined as being inclusive of random copolymers, alternating copolymers, graft copolymers, and block copolymers. The term "random copolymer" is defined as a copolymer comprising macromolecules in which the probability of finding a given monomeric unit at any given site in the chain is independent of the nature of the adjacent units. In a random copolymer, the sequence distribution of monomeric units follows Bernoullian statistics. The term "alternating copolymer" is defined as a copolymer comprising macromolecules that include two species of monomeric units in alternating sequence.

The term "oligomer" is defined as a polymer intermediate containing relatively few structural or monomeric units. The term "telomer" is defined as an oligomer obtained by telomerization, that is, by the chain reaction synthesis carried out in the presence of a large amount of a chain-transfer agent, so that the end-groups of the oligomer are essentially fragments of the chain-transfer agent. The term "macromer" is defined as a polymer macromolecule of which has at the minimum a reactive group at one end or inside the chain. Such macromolecule can undergo further polymerization via the reactive group thereby contributing constitutional units to the essential structure of the polymer. The term "macromer" is further defined as a synonym of the term "macromonomer." The term "prepolymer" is defined to be inclusive of one or a combination of different monomers, oligomers, and macromers that are capable of forming a polymer. The term "organo-soluble" polymer is defined as a homopolymer, copolymer, oligomer, macromer, telomer, or prepolymer that is soluble in an organic solvent.

The term "polymer solution" is defined as a stable one-phase system comprising at least one polymer and at least one solvent. The stability of the system is defined in terms of the Gibbs free energy $\Delta G$ which can be determined as follows:

$$\Delta G = \Delta H - T\Delta S,$$

where $\Delta H$ and $\Delta S$ are the enthalpy change and the entropy change, respectively, that a system comprising a polymer and a solvent undergoes at temperature T (in Kelvins). Values $\Delta H$ and $\Delta S$ are determined by physical and chemical properties of the polymer and the solvent. The polymer and a solvent are capable of instantaneously forming a stable polymer solution if the value of $\Delta G$ is negative. In other words, a stable polymer solution can be formed when a polymer and a solvent are combined at a temperature T, and one of the following three conditions applies:

(1) either both $\Delta H<0$ and $\Delta S>0$; or (2) both $\Delta H<0$ and $\Delta S<0$ with a further proviso that $|\Delta H|>|T\Delta S|$; or (3) both $\Delta H>0$ and $\Delta S>0$ with a further proviso that $|\Delta H|<|T\Delta S|$.

The term "water-soluble polymer" is defined as a polymer capable of forming a stable aqueous polymer solution at least at some temperature.

The terms "hydrophilic" and "hydrophobic" are defined using the Hildebrand solubility parameter $\delta$. The term "Hildebrand solubility parameter" refers to a parameter measuring the cohesion of a substance and is determined as follows:

$$\delta = (\Delta E/V)^{1/2}$$

where $\delta$ is the solubility parameter, $(cal/cm^3)^{1/2}$; $\Delta E$ is the energy of vaporization, cal/mole; and V is the molar volume, $cm^3$/mole.

A polymer is defined as "hydrophobic" if it has the $\delta$ value of about $11(cal/cm^3)^{1/2}$ or less. A polymer is defined as "hydrophilic" if it has the $\delta$ value higher than about $11(cal/cm^3)^{1/2}$.

Some embodiments of the present invention provide for using a blend of polymers. A different definition of "hydrophobic" and "hydrophilic" is used for the blends. To define a polymer as "hydrophobic" or "hydrophilic" in a blend, relative values of $\delta$ are used. Whichever polymer in the polymer blend has lower $\delta$ value compared to the $\delta$ value of the other polymer in the blend is designated as a hydrophobic polymer, and the polymer with higher $\delta$ value is designated as hydrophilic.

If more than two polymers are used in the blend, then each can be ranked in order of its $\delta$ value. In one exemplary embodiment, the $\delta$ value defining the boundary between the hydrophobic and hydrophilic components of the polymer blend can be about $11(cal/cm^3)^{1/2}$. Similarly for the monomers, if a monomer is referred to as "more hydrophilic" than another monomer, the reference means that the former has a higher $\delta$ value than the latter, regardless of what the actual values of $\delta$ are for each monomer.

The term "thermoresponsive polymer" is defined as a polymer that can instantaneously change one or more of its properties at a particular temperature ("critical temperature"). One of such properties is the polymer's solubility in a particular solvent. To illustrate, a polymer solution that is stable below the critical temperature can be prepared, the polymer solution including a thermorepsonsive polymer dissolved in a solvent. If this stable polymer solution is heated, it can lose its stability and instantaneously form a separate polymer phase when the critical temperature of the polymer solution has been reached. Conversely, a polymer system, such as a suspension including a thermorepsonsive polymer suspended in a solvent, can be unstable at the critical temperature or a higher temperature. If this unstable polymer system is cooled, it can instantaneously become a stable polymer solution when the critical temperature of the polymer solution has been reached.

The term "lower critical solution temperature" or "LCST" is defined as a temperature of a polymer solution, below which the polymer solution is stable, i.e., a temperature at which the value of $\Delta G$ described above is negative If the temperature of the solution is increased, upon reaching LCST, the value of $\Delta G$ becomes zero or positive, and, consequently, the polymer of the solution becomes insoluble in the solvent of the solution and forms a separate phase. Not every polymer solution has the LCST; the fact of existence or non-existence of the LCST depends on chemical and physical properties of polymer(s) forming the polymer solution.

The term "light" is defined as radiation emitted at optical wavelengths. The term "optical wavelengths" is defined as wavelengths which include the part of the spectrum extending from the near infrared, through the visible, to the ultraviolet. The term "visible" is defined as radiation which stimulates the optical receptors of the eye, and having a wavelength between about 3,850 and about 7,600 Angstrom. The term "light" is further defined to also include radiation emitted at the parts of the spectrum which extends from the near infrared through the long wavelength, far infrared, and from the ultraviolet to X-rays and y-rays at the shortest wavelengths.

The term "turbid" is defined as an optical property of the polymer/solvent system that causes light to be scattered and absorbed rather than transmitted in straight lines through the sample. Turbidity is the measure of clarity of the polymer/solvent system. Any optical method, to be selected by those having ordinary skill in the art, can be used to measure the degree of turbidity.

One method that can be used to measure the degree of turbidity is nephelometry. According to the nephelometry method, the ratio is determined between the amount of light transmitted straight through a liquid sample is measured and the amount of light scattered at an angle of 90° to one side.

With the reference to FIG. 1, according to one embodiment of the invention, a polymer solution having a lower critical solution temperature (LCST) can be prepared. The polymer solution can be prepared by dissolving a thermoresponsive polymer in a suitable solvent. The polymer solution can include an aqueous solution of any water-soluble thermoresponsive polymer, or a solution of any organo-soluble thermoresponsive polymer in a suitable organic solvent. Any appropriate method known to those having ordinary skill in the art can be used for preparing the polymer solution; for example, combining a polymer and a solvent at a temperature below LCST, followed by energetic stirring.

An example of a polymer solution that can be used includes an aqueous solution (i.e., the solvent is water) of a water-soluble thermoresponsive polymer. The aqueous polymer solution can contain between about 0.005 mass % and about 50 mass % of the water-soluble thermoresponsive polymer, for example, between about 0.2 mass % and about 0.5 mass % of the water-soluble thermoresponsive polymer, the balance comprising de-ionized water.

Another example of the polymer solution that can be used includes an organic solvent solution of an organo-soluble thermoresponsive polymer. The organic solvent polymer solution can contain between about 0.005 mass % and about 50 mass % of the organo-soluble thermoresponsive polymer, for example, between about 0.2 mass % and about 0.5 mass % of the organo-soluble thermoresponsive polymer, the balance comprising a suitable organic solvent.

The thermoresponsive polymers that can be used to prepare the polymer solution can be capable to form a solution having the LCST within a range between the melting point of the solvent and the boiling point of the solvent. For example, the LCST of either an aqueous polymer solution or an organic solvent polymer solution can be between about 2° C. and about 80° C., such as between about 20° C. and about 60° C., more narrowly, between about 25° C. and about 40° C., for example, about 32° C.

When the temperature of the polymer solution is below the LCST, the polymer solution can be clear and optically transparent. The solution can become turbid when the temperature has been raised to the LCST or to a temperature higher than the LCST. The process is reversible and the solution can again become clear and optically transparent if it is cooled to a temperature below the LCST. The heating-cooling cycle causing clouding-clearing of the solution can be repeated any desired number of times. This concept is schematically illustrated by FIG. 1.

As shown by FIG. 1, at a temperature below the LCST, a stable one phase polymer solution exists, and the optical transparency of the solution is at about 100%. If the solution is heated, upon reaching the LCST, the polymer becomes insoluble, resulting in a rapid formation of a separate second polymer phase, leading to precipitous loss of the optical transparency. Any change in the optical transparency, for example, a decrease in transparency to about 99% or of the original optical transparency or less, such as about 95% or of the original optical transparency or less, can be indicative of the temperature having reached the LCST.

Both water- and organo-soluble thermoresponsive polymers that can be used can undergo the changes at the point of reaching the LCST as described above and shown by FIG. 1. For example, water-soluble thermoresponsive polymers that can be used are hydrophilic polymers usually having pendant polar groups. At a temperature below the LCST, these polymers are typically in a form of a random coil that allows water to solubilize the polymer to form a clear solution. Once the temperature of the solution has been raised to the LCST, the polymer undergoes rapid transformation into a globular structure losing, at least partially, its solubility in water. As a result, the polymer forms a separate phase and the solution becomes less optically transparent and more turbid compared to the solution at a temperature below the LCST.

Examples of suitable water-soluble thermoresponsive polymers that can be used in the aqueous polymer solutions described above include poly(N-isopropylacrylamide), polycaprolactone, polycaprolactam, and nicotine. These polymers are available commercially, or can be synthesized by using polymerization techniques well known to those having ordinary skill in the art. One exemplary method of polymerization that can be used is radical polymerization of a respective monomer.

Examples of suitable organo-soluble thermoresponsive polymers that can be used in the organic solvent polymer solutions described above include copolymers of vinyl acetate and vinyl alcohol, such as poly(vinyl acetate-co-vinyl alcohol), or copolymers of methyl methacrylate and styrene, such as poly(methyl methacrylate-co-styrene). Those having ordinary skill in the art can select the solvent(s) that are suitable for dissolving these organo-soluble thermoresponsive polymers, to form the organic solvent polymer solutions.

The thermoresponsive properties of polymers can be modified and fine-tuned, if desired. Consequently, a thermoresponsive polymer forming a solution having a predetermined LCST can be obtained. To illustrate, the LCST of the aqueous solution of poly(N-isopropylacryl amide) is about 32° C. A polymer solution having the LCST either higher or lower than 32° C. can be obtained by using, instead of pure poly(N-isopropylacryl amide), a copolymer that includes units derived from N-isopropylacryl amide. The copolymer can be obtained by copolymerization of N-isopropylacrylamide and at least one second monomer, leading to a copolymer including units derived from N-isopropylacrylamide and from the second monomer. The LCST of the solution that can be prepared from the copolymer can be adjusted as desired by varying the ratio between the units derived from N-isopropylacrylamide and the units derived from the second monomer.

To illustrate, if it is desirable to obtain a polymer solution having the LCST higher than 32° C., a second monomer that is more hydrophilic that N-isopropylacryl amide can be used to prepare the copolymer. Some examples of such more hydrophilic monomers include acrylic acid or pentenoic acid. Those having ordinary skill in the art can select other suitable more hydrophilic monomers to be copolymerized with N-isopropylacryl amide, if desired. Consequently, such copolymers, e.g., poly(N-isopropylacryl amide-co-acrylic acid), are more hydrophilic than pure poly(N-isopropylacryl amide). As a result, these copolymers can have LCST higher than 32° C.

Conversely, if it is desirable to obtain a polymer solution with the LCST lower than 32° C., a second monomer that is more hydrophobic that N-isopropylacryl amide can be used to prepare the copolymer. Some examples of such more hydrophobic monomers include styrene, butene, or pentene. Those having ordinary skill in the art can select other suitable more hydrophobic monomers to be copolymerized with N-isopropylacryl amide, if desired. Consequently, such copolymers, e.g., poly(N-isopropylacryl amide-co-styrene), are more hydrophobic than pure poly(N-isopropylacryl amide). As a result, these copolymers can have LCST lower than 32° C. Examples of some copolymers forming aqueous solutions having the LCSTs higher or lower than 32° C. are included in Table 1.

TABLE 1

N-isopropylacrylamide-Based Polymers and LCST of Their Aqueous Solutions

| No. | Monomer and Mass Percentage of Units Derived From the Monomer | | | LCST, °C. |
|---|---|---|---|---|
| | N-isopropylacrylamide | Styrene | Acrylic Acid | |
| 1 | 95 | 5 | 0 | 20 |
| 2 | 98 | 2 | 0 | 27 |
| 3 | 99 | 1 | 0 | 30 |
| 4 | 100 | 0 | 0 | 32 |
| 5 | 99 | 0 | 0 | 34 |
| 6 | 98 | 0 | 2 | 37 |
| 7 | 95 | 0 | 5 | 45 |

Instead of using individual copolymers to adjust the LCST of the polymer solution, blends of individual homopolymers and/or copolymers can be used to make the solution to accomplish such an adjustment. The polymer solutions can be either aqueous or organic-solvent based. Those having ordinary skill in the art can determine the ratio between the individual homopolymers and/or copolymers in the blend, as well as the total concentration of the entire blend in the solution.

For example, a total concentration of all the homopolymers and/or copolymers in the blend be between about 0.005 mass % and about 50 mass %, for example, between about 0.2 mass % and about 0.5 mass %. To illustrate further, one example of a blend of polymers that can be used is the blend comprising two polymers, and the ratio between the two polymers can vary according to the LCST of the solution that is desirable to be obtained; for instance, the mass ratio between the two polymers in the blend can be 1:1.

When using the blend of polymers as described above, those having ordinary skill in the art will realize that the entire blend needs to be completely soluble in the solvent at a temperature below the predetermined desired LCST, and will select the proper solvent and concentration of the blend accordingly.

One example of an aqueous solution of a polymer blend that can be used is a 0.3% (mass) solution comprising a polymer blend of poly(N-isopropylacrylamide) and poly (acrylic acid) in water. Using such blend can allow to have the LCST of the solution higher than 32° C. By adjusting the ratio between poly(N-isopropylacrylamide) and poly(acrylic acid) in the blend, those having ordinary skill in the art can obtain the solution having a predetermined desired LCST higher than 32° C.

Some examples of other blends that can be used to prepare the aqueous polymer solutions include the blends of poly (N-isopropylacryl amide) with at least one of any of poly (pentenoic acid), poly(butene), or poly(pentene). Still other examples of other blends that can be used include blends of any of polycaprolactone, polycaprolactam, or nicotine with at least one of any of poly(acrylic acid), poly(pentenoic acid), poly(butene) or poly(pentene).

Some examples of the polymer blends that can be used to prepare the organic-solvent polymer solutions include the blends of poly(vinyl acetate) and poly(vinyl alcohol), or blends of poly(methyl methacrylate) and polystyrene. Those having ordinary skill in the art can select the solvent(s) that are suitable for dissolving such blends, to form the organic solvent polymer solutions.

Figure 2A:
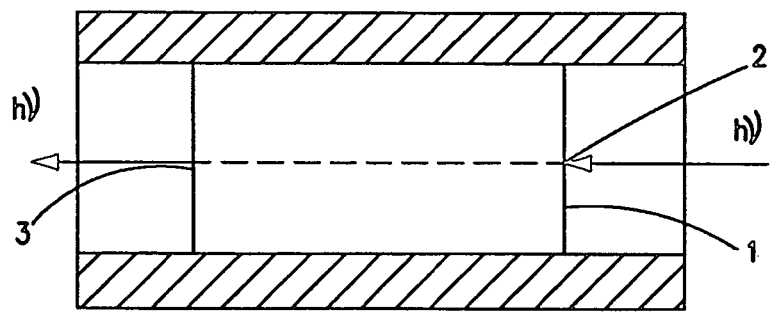
FIG. 2A shows that light passes through a polymer solution at a temperature below the low critical temperature of the solution.
Figure 2B:
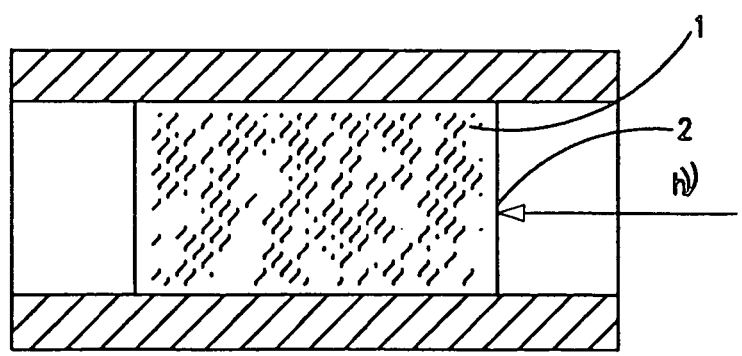
FIG. 2B shows that light does not pass through a polymer solution at a temperature at the low critical temperature of the solution, or at a higher temperature.

Polymer solutions described above can be utilized in a method for detecting and/or controlling temperature of a microchip and in an apparatus that can be used to carry out the method. The general concept of the method is illustrated schematically by FIGS. 2A and 2B. As can be seen from FIG. 2A, light is directed through a polymer solution 1. The solution is at a temperature below the LCST, and light entering the solution at point 2 passes through and exits the solution at point 3. If the temperature increases to the LCST or to a higher temperature, the solution becomes turbid, and light entering at point 2 is blocked and cannot pass through the solution and exit (FIG. 2B). A method for measuring, controlling and/or maintaining the temperature of a microchip can be based on the above described phenomenon. The method can include the following.

A sealed container containing a polymer solution having a predetermined LCST, which is lower than the ambient temperature, can be placed in a contact with a microchip. Any type of a container can be used, for example, a capillary tube. Both ends of the tube can be attached to optical fibers and sealed, for example, using a clear epoxy resin. To attach the tube to the microchip, a suitable adhesive, which can be selected by those having ordinary skill in the art, can be used.

The method for measuring, controlling and/or maintaining the temperature of a microchip can utilize the above-described the solution that was placed in contact with the microchip. Referring to the flow chart shown by FIG. 2C, the method can include the following. Light can be directed through the polymer solution. For example, visible light, UV radiation, or radiation generated by a source of infra-red, fluorescent, or phosphorescent light can be used. Light can travel through the solution and can be detected at the exit point using a detector. If the temperature increases to the LCST, the solution becomes turbid, and the light signal is interrupted and no longer reaches the detector, indicating that the temperature on the surface of the microchip is the LCST or a higher temperature.

Figure 2C:
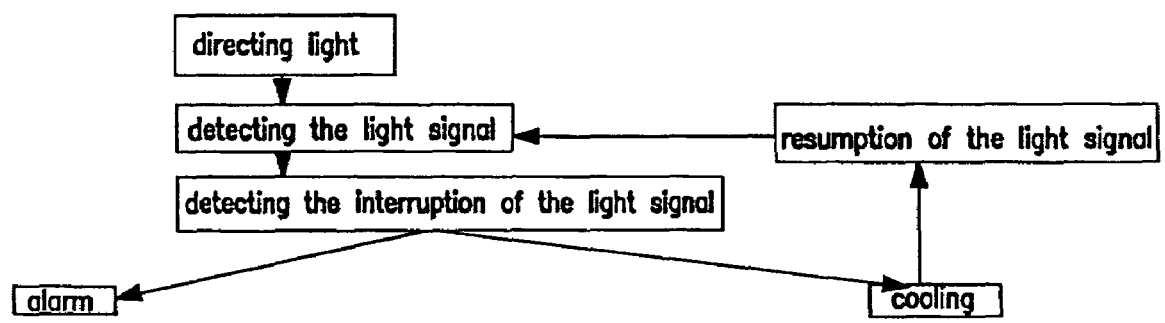
FIG. 2C is a flow chart diagram, demonstrating one embodiment of a method for measuring, controlling and/or maintaining the temperature of a microchip.

Once it has been detected that the light signal has been interrupted as a result of the temperature rise on the external surface of the microchip or inside the microchip, various options are available. Two of such options are shown by the flow chart (FIG. 2C). In one embodiment, an alarm can be triggered. Those having ordinary skill in the art can select a suitable alarm. In another embodiment, a cooling medium can be directed to the microchip, to reduce the external temperature thereof. The cooling medium that can be used includes air or a suitable cooling fluid.

Once the temperature on the surface of the microchip or inside the microchip drops below the LCST, the solution in the tube becomes clear again, since the process of dissolving the polymer is reversible, as described above. When the solution becomes clear, the passage of light through the solution is resumed, as shown by the flow chart (FIG. 2C). Once the presence of light at the exit point of the solution is again detected by the detector, the alarm can be deactivated, or the supplying of the cooling medium can be terminated. The described cycle can be repeated any desired number of times.

Figure 3A:
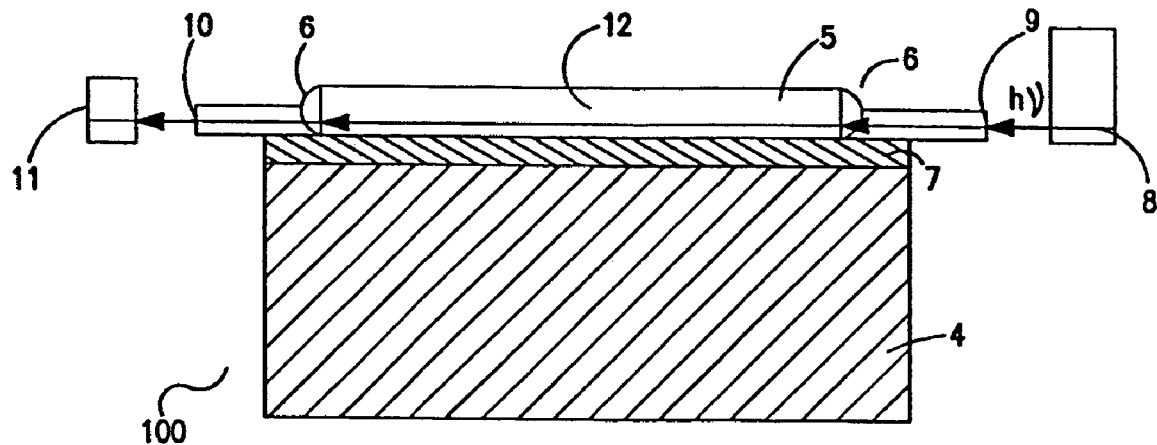
FIGS. 3A and 3B show, respectively, a schematic cross-sectional view and a schematic top view of an apparatus according to an embodiment of the present invention.
Figure 3B:
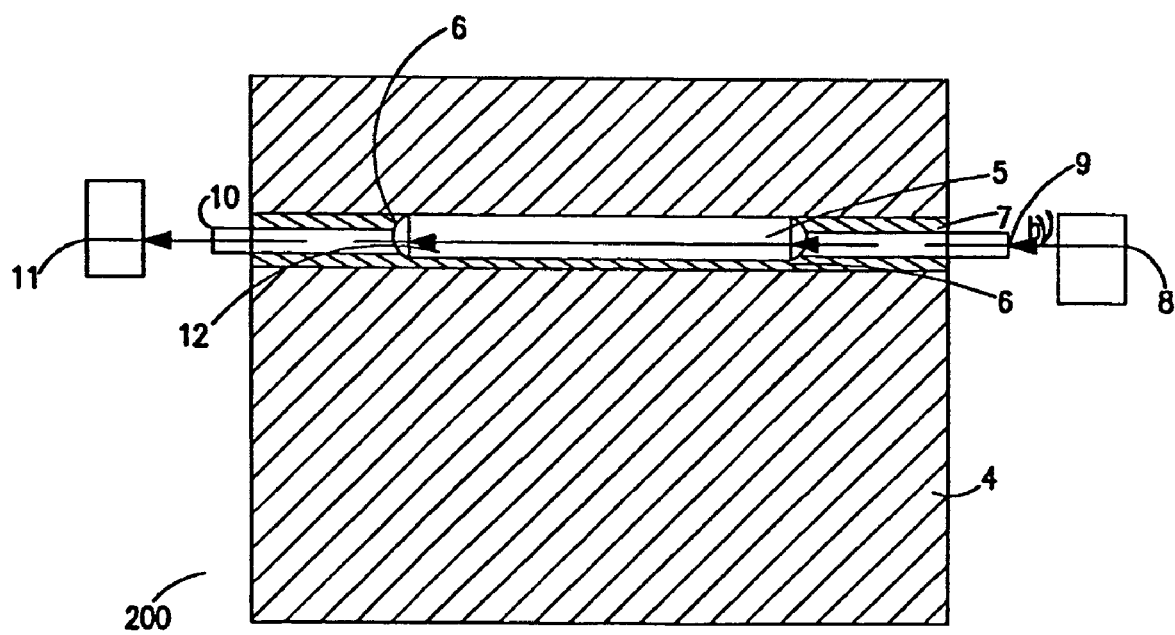

Various embodiments of an apparatus can be used for carrying out the method described above. One exemplary embodiment of an apparatus that can be used is shown by FIGS. 3A and 3B. The cross-sectional view 100 of the apparatus (FIG. 3A) and the top view 200 of the apparatus (FIG. 3B) show a microchip 4 having a capillary tube 5 attached to the microchip 4 using the adhesive 7. The capillary tube 5 is sealed on both ends and contains a polymer solution 12 in an optically transparent state. The clear epoxy resin 6 serves to attach optic fibers 9 and 10 to both ends of the capillary tube 5.

Light can be generated by the device 8 and can be directed through the optic fiber 9. Examples of the light generating device 8 can include a source of visible light, a laser, a stroboscope, a photomultiplier, or a synchrotron. Light can travel through the clear solution 12 and exit the capillary tube 5 via the optic fiber 10. At the exit point, the presence of light can be detected by the detector 11. Those having ordinary skill in the art can select the detector 11 capable of detecting the signal generated by a particular light generating device 8.

When the temperature on the surface of the microchip 4 or inside the microchip 4 rises to, or above, the LCST, the solution 12 becomes turbid, the light can no longer pass through the solution; consequently, the detector 11 will no longer detect the presence of light, thus indicating that the temperature on the surface of the microchip 4 is equal to the LCST or is higher than the LCST. Accordingly, either an alarm (not shown) or a cooling device (not shown) can be activated as described above.

Figure 4:
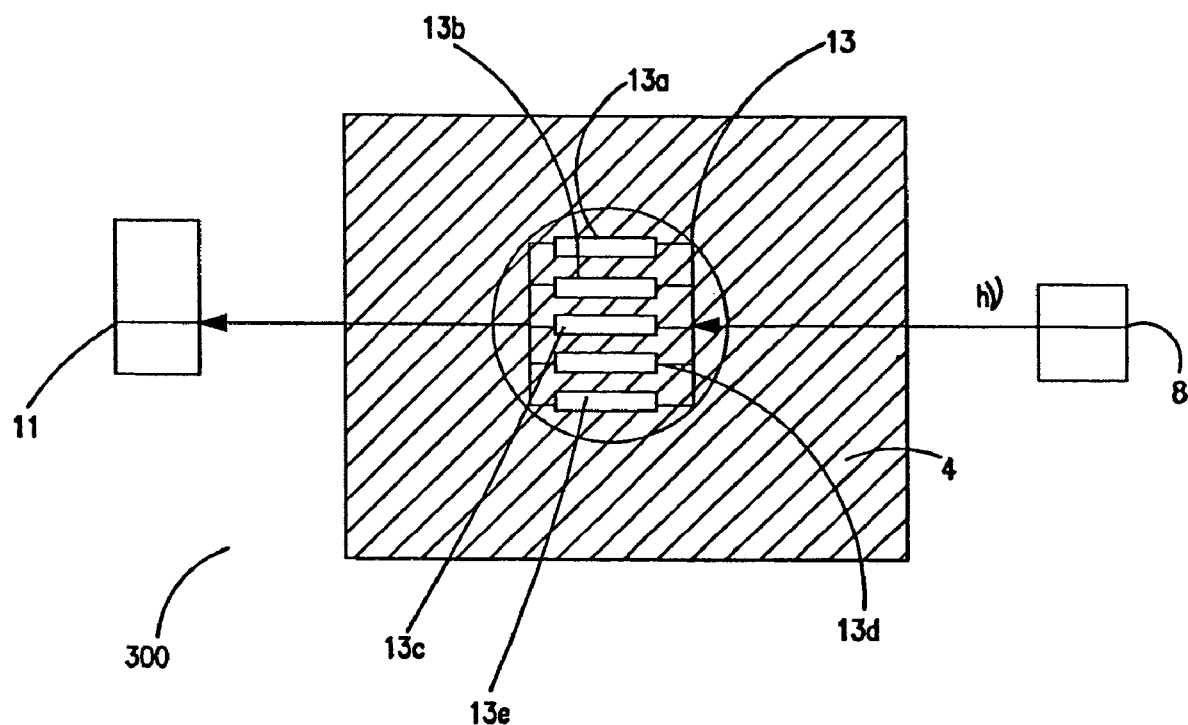
FIG. 4 shows a schematic top view of an apparatus according to another embodiment of the present invention.

Another embodiment 300 of the apparatus is schematically illustrated by FIG. 4. The embodiment 300 includes an array of capillary tubes 13, instead of a single tube 5 of the embodiment shown by FIGS. 3A and 3B. The array allows to measure the temperature on the surface of the microchip with more precision. The array can contain any number of the capillary tubes, each containing a polymer solution having the LCST that is different from the LCST of a solution in any other capillary tube. As an example, the array 13 includes five capillary tubes 13a, 13b, 13c, 13d, and 13e. Light is directed through all five capillary tubes 13a-13e. The LCST of the exemplary polymer solutions contained in the capillary tubes 13a-13e can be as shown by Table 2.

TABLE 2

LCST of the Polymer Solutions in Capillary Tubes 13a-13e.

| No. | Capillary Tube of the Array 13 | LCST, ° C. |
|---|---|---|
| 1 | 13a | 35 |
| 2 | 13b | 36 |
| 3 | 13c | 37 |
| 4 | 13d | 38 |
| 5 | 13e | 39 |

If a temperature on the surface of the microchip 4 reaches 35° C., light will no longer pass through the capillary tube 13a; if a temperature on the surface of the microchip 4 reaches 36° C., light will no longer pass through the capillary tube 13b, etc. The amount of light reaching the detector 11 is proportional to the number of capillary tubes that still allow light to pass. Accordingly, if all five tubes 13a-13e contain the solution in the optically transparent form, the temperature on the surface of the microchip is under 35° C., if only four tubes 13b-13e are open for light, the temperature has reached 35° C. but is under 36° C., and so on.

The following examples are intended to illustrate but not limit the invention.

EXAMPLE 1

Fabrication of a Sensor Including Poly(N-Isopropylacrylamide)

This example illustrates how to make a sensor according to an embodiment of the present invention. According to the example, a polymer solution can be prepared by mixing and stirring, at room temperature, the following components until a clear polymer solution is obtained:

(a) between about 0.1 and about 0.5 mass % of poly(N-isopropylacrylamide); and (b) the balance, de-ionized water.

The polymer solution can be placed into a glass capillary tube, for example, the tube of about 200 µm in length and about 50 µm in diameter. The tube containing the solution can be sealed and an optic fiber can be attached to each end of the tube. For example, glass fiber having a diameter of about 50 µm can be used. Clear epoxy resin, such as biphenyl epoxy resin, can be used to attach the optic fibers. Those having ordinary skill in the art can select a suitable epoxy resin to be used. The tube can then be attached to an outer surface of a silicon or polymer microchip using an adhesive, such as bismaleimide. Those having ordinary skill in the art can also determine which adhesive is to be used for attaching the tube to the surface of the microchip.

EXAMPLE 2

Fabrication of a Sensor Including an N-Isopropylacrylamide-Based Copolymer

This example illustrates how to fabricate a sensor according to an embodiment of the present invention. A copolymer of N-isopropylacrylamide with a hydrophilic monomer can be used to make a polymer solution. Hydrophilic monomers that can be used include acid or amine types of monomers, e.g., acrylic acid. According to the example, a polymer solution can be prepared by mixing and stirring, at room temperature, the following components until a clear polymer solution is obtained:

(a) about 0.005 mass % of a poly(N-isopropylacrylamide) copolymer, for example, poly(N-isopropylacrylamide-co-acrylic acid) and (b) the balance, de-ionized water.

The mass ratio between the N-isopropylacrylamide-based units and the acrylic acid-based units in the copolymer can be between about 999:1 and about 49:1, for example, about 99:1. The aqueous solution of poly(N-isopropylacrylamide-co-acrylic acid) can be used to fabricate the sensor as described in Example 1.

EXAMPLE 3

Fabrication of a Sensor Including an N-Isopropylacrylamide-Based Copolymer

This example illustrates how to fabricate a sensor according to an embodiment of the present invention. A copolymer of N-isopropylacrylamide with a hydrophobic monomer can be used to make a polymer solution. An example of a hydrophobic monomer that can be used is styrene. According to the example, a polymer solution can be prepared by mixing and stirring, at room temperature, the following components until a clear polymer solution is obtained:

(a) about 0.005 mass % of a poly(N-isopropylacrylamide) copolymer, for example, poly(N-isopropylacrylamide-co-styrene) and (b) the balance, de-ionized water.

The mass ratio between the N-isopropylacrylamide-based units and the styrene-based units in the copolymer can be between about 99:1 and about 19:1, for example, about 49:1.

The aqueous solution of poly(N-isopropylacrylamide-co-styrene) can be used to fabricate the sensor as described in Example 1.

EXAMPLE 4

Fabrication of a Sensor Including a Polymer Blend

This example illustrates how to fabricate a sensor according to an embodiment of the present invention. A blend of polymers can be used to make a polymer solution. An example of a hydrophobic monomer that can be used is styrene. According to the example, a polymer solution can be prepared by mixing and stirring with hydrophilic polymer, at room temperature, the following components until a clear polymer solution is obtained:

(a) about 1.0 mass % of poly(N-isopropylacrylamide);
(b) about 1.0 mass % of poly(acrylic acid); and
(c) the balance, de-ionized water.

The aqueous solution of the blend of poly(N-isopropylacrylamide) and (poly)acrylic acid can be used to fabricate the sensor as described in Example 1.

EXAMPLE 5

Using a Sensor for Controlling the Temperature

This example illustrates how to use a sensor according to an embodiment of the present invention. A sensor can be fabricated as described in Example 1. Light can be generated by a suitable light generator, e.g., by a laser or a stroboscope, and directed through the polymer solution contained in the tube. Upon exit of the light signal from the polymer solution, the light signal can be detected by a photo detector. Those having ordinary skill in the art can select a suitable detector to be used, depending, among other factors, on what kind of a light detector is used.

When the temperature on the surface of the microchip reaches the level that is higher than the LCST of the polymer solution, the passage of light through the solution is interrupted and the presence of the light signal is no longer detected. A cooling medium can be directed to the microchip at this point to reduce the temperature to a pre-determined acceptable level. Examples of the cooling medium that can be used include air blown by a fan or any liquid coolant to be selected by those having ordinary skill in the art. The liquid coolant, if used can be directed by a pump around the microchip.

Although the embodiments of the invention have been described with reference to the above examples, it will be understood that modifications and variations are encompassed within the spirit and scope of the invention. Accordingly, the invention is limited only by the following claims.

What is claimed is:

1. An apparatus for detecting and/or controlling temperature on an external surface of a microchip or inside a microchip, the apparatus comprising: at least one tube placed in contact with the surface of the microchip or inside the microchip, each tube containing a polymer solution, the polymer solution contained in each tube comprising at least one polymer dissolved in a solvent, wherein: (a) the polymer solution is optically transparent at a temperature below the lower critical solution temperature of the polymer solution, the polymer solution having a first degree of optical transparency; and (b) the polymer solution is turbid at a temperature equal to the lower critical solution temperature of the polymer solution, or at a higher temperature, the polymer solution having a second degree of optical transparency, wherein the first degree of optical transparency is higher than the second degree of optical transparency.

2. The apparatus of claim 1, wherein the polymer solution includes a water-soluble polymer or an organo-soluble polymer.

3. The apparatus of claim 2, wherein the solvent is water.

4. The apparatus of claim 2, wherein the water-soluble polymer is selected from a group consisting of poly(N-isopropylacrylamide), polycaprolactam, polycaprolactone, nicotine and derivatives, analogs and mixtures thereof.

5. The apparatus of claim 2, further including a hydrophobic polymer.

6. The apparatus of claim 5, wherein the hydrophobic polymer is selected from a group consisting of polystyrene, poly(butene), poly(pentene), and blends thereof.

7. The apparatus of claim 2, further including a hydrophilic polymer.

8. The apparatus of claim 7, wherein the hydrophilic polymer is selected from a group consisting of poly(acrylic acid), poly(pentenoic acid), and blends thereof.

9. The apparatus of claim 2, wherein the organo-soluble polymers selected from a group consisting of poly(vinyl acetate-co-vinyl alcohol) and poly(methyl methacrylate-co-styrene).

10. The apparatus of claim 1, wherein the polymer is a copolymer.

11. The apparatus of claim 10, wherein the copolymer is a product of copolymerization of N-isopropylacryl amide with at least one second monomer.

12. The apparatus of claim 11, wherein the second monomer is selected from a group consisting of acrylic acid, pentenoic acid, styrene, butene, and pentene.

13. The apparatus of claim 1, wherein the second degree of optical transparency of the polymer solution is about 99% of the first degree of optical transparency or less.

14. The apparatus of claim 1, wherein the second degree of optical transparency of the polymer solution is about 95% of the first degree of optical transparency or less.

15. The apparatus of claim 1, wherein the concentration of the at least one polymer in the solution is between about 0.005 mass % and about 50 mass %.

16. The apparatus of claim 1, wherein the concentration of the at least one polymer in the solution is between about 0.2 mass % and about 0.5 mass %.

17. The apparatus of claim 1, including a plurality of tubes, each tube containing a polymer solution having the lower critical solution temperature that is different from the lower critical solution temperature of a polymer solution contained in any other tube.

18. The apparatus of claim 1, further comprising a source of light, wherein the source provides a light signal directed at the polymer solution.

19. The apparatus of claim 17, wherein the source of light comprises a source of visible light, a laser, a stroboscope, a photomultiplier, or a synchrotron.

20. The apparatus of claim 18, further comprising a detector of light, wherein the detector receives the light signal provided by the source, wherein the strength of the signal received by the detector is proportional to the optical transparency of the polymer solution.

21. The apparatus of claim 20, further comprising a device capable of reacting to the presence or the absence of a light signal.

22. The apparatus of claim 21, wherein the device is capable of providing a cooling medium to the microchip.

23. The apparatus of claim 21, wherein the device is an air fan or a pump for pumping a liquid.

24. The apparatus of claim 22, wherein the cooling medium is air or a fluid.

25. The apparatus of claim 21, wherein the device is an alarm.

* * * * *

UNITED STATES PATENT AND TRADEMARK OFFICE
CERTIFICATE OF CORRECTION

PATENT NO. : 7,307,141 B2 Page 1 of 1
APPLICATION NO. : 11/399890
DATED : December 11, 2007
INVENTOR(S) : Kooi It is certified that error appears in the above-identified patent and that said Letters Patent is hereby corrected as shown below:

In column 12, line 64, In Claim 21, delete "to" and insert -- in --, therefor.

Signed and Sealed this

Second Day of September, 2008

JON W. DUDAS
*Director of the United States Patent and Trademark Office*